(12) United States Patent
Chen et al.

(10) Patent No.: US 10,853,697 B2
(45) Date of Patent: Dec. 1, 2020

(54) SYSTEM AND METHOD FOR MONITORING ONLINE RETAIL PLATFORM USING ARTIFICIAL INTELLIGENCE AND FIXING MALFUNCTION

(71) Applicants: Beijing Jingdong Shangke Information Technology Co., Ltd., Beijing (CN); JD.com American Technologies Corporation, Mountain View, CA (US)

(72) Inventors: Li Chen, Belmont, CA (US); Shizhu Liu, Santa Clara, CA (US); Kailin Huang, Mountain View, CA (US); Shanglin Yang, Sunnyvale, CA (US); Hui Zhou, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 177 days.

(21) Appl. No.: 16/114,664

(22) Filed: Aug. 28, 2018

(65) Prior Publication Data
US 2020/0074242 A1    Mar. 5, 2020

(51) Int. Cl.
*G06K 9/62* (2006.01)
*G06Q 30/06* (2012.01)
(Continued)

(52) U.S. Cl.
CPC ....... *G06K 9/6267* (2013.01); *G06F 16/9535* (2019.01); *G06K 9/325* (2013.01); *G06Q 30/0601* (2013.01)

(58) Field of Classification Search
CPC .. G06K 9/6267; G06K 9/325; G06Q 30/0601; G06F 15/9535
See application file for complete search history.

(56) References Cited

U.S. PATENT DOCUMENTS 6,954,678 B1 *  10/2005  Phan ...................... H01L 22/26
                                                    257/E21.528
7,085,820 B1 *  8/2006  Nickerson ............. G06F 16/958
                                                    709/219
(Continued)

OTHER PUBLICATIONS

Mani, Senthil et al., DeepTriage: Exploring the Effectiveness of Deep Learning for Bug Triaging IBM Research, Jan. 4, 2018 (Year: 2018).*

(Continued)

*Primary Examiner* — Scott L Jarrett
(74) *Attorney, Agent, or Firm* — China Science Patent & Trademark US LLC; Shanyun Lu

(57) ABSTRACT

A method and system for monitoring an e-commerce platform using artificial intelligence and fixing malfunctions on the e-commerce platform. The method includes: receiving, by a computing device, a feedback submitted by a user through the e-commerce platform; generating a vector based on content of the feedback, context of the feedback and profile of the user using AI processors; and classifying the vector to determine function corresponding to the feedback and status of the function using AI classifiers. The content includes text, voice, image and video; the context includes time, location and submission channel of the feedback; the profile includes attributes, history and preference of the user. Dimensions of the vector respectively corresponding to the text, voice, image, video, time, location, submission channel, attributes, history, and preference of the user.

20 Claims, 12 Drawing Sheets

(51) Int. Cl.
*G06K 9/32* (2006.01)
*G06F 16/9535* (2019.01)

(56) References Cited

U.S. PATENT DOCUMENTS

| | | | | |
|---|---|---|---|---|
| 7,100,081 | B1* | 8/2006 | Purdy | G05B 19/41875 702/34 |
| 7,614,043 | B2* | 11/2009 | Ognev | G06F 11/366 706/12 |
| 7,620,887 | B1* | 11/2009 | Lubbers | G06F 11/3692 715/205 |
| 8,145,073 | B2* | 3/2012 | Bouchard | G03G 15/5079 358/1.15 |
| 8,494,897 | B1* | 7/2013 | Dawson | G06Q 30/02 705/14.42 |
| 8,666,390 | B2* | 3/2014 | Meredith | H04W 24/08 455/404.2 |
| 8,713,438 | B1* | 4/2014 | Broniek | G06F 40/169 715/715 |
| 8,923,134 | B2* | 12/2014 | Meredith | H04W 16/18 370/241 |
| 9,020,943 | B2* | 4/2015 | Caldwell | G06F 16/285 707/737 |
| 9,569,782 | B1* | 2/2017 | Lavery | G06F 40/40 |
| 10,049,302 | B1* | 8/2018 | Liu | G06K 9/6269 |
| 10,108,473 | B2* | 10/2018 | Jhunjhunwala | G06F 11/0769 |
| 10,176,434 | B2* | 1/2019 | Moghaddam | G06F 40/30 |
| 10,430,517 | B1* | 10/2019 | Mulwad | G06F 9/453 |
| 10,459,962 | B1* | 10/2019 | Jayaraman | G06F 16/3347 |
| 10,482,000 | B2* | 11/2019 | Vikjord | G06N 7/005 |
| 10,558,554 | B2* | 2/2020 | Bhandarkar | G06F 11/3409 |
| 10,565,077 | B2* | 2/2020 | Hayden | G06N 20/00 |
| 10,565,234 | B1* | 2/2020 | Sims | H04L 41/5074 |
| 10,684,910 | B2* | 6/2020 | Chau | G06F 8/65 |
| 2004/0158429 | A1* | 8/2004 | Bary | G06F 16/958 702/183 |
| 2004/0252878 | A1* | 12/2004 | Okuda | G06T 7/0006 382/145 |
| 2005/0114319 | A1* | 5/2005 | Brent | G06F 16/3322 |
| 2005/0240827 | A1* | 10/2005 | Sankaran | G06F 16/958 714/43 |
| 2007/0211932 | A1* | 9/2007 | Lee | G06T 7/0004 382/145 |
| 2009/0003684 | A1* | 1/2009 | Alqudah | H01L 21/67288 382/149 |
| 2010/0131450 | A1* | 5/2010 | Nguyen | G06N 5/022 706/54 |
| 2013/0279790 | A1* | 10/2013 | Kaizerman | G06T 7/001 382/144 |
| 2016/0092791 | A1* | 3/2016 | Moghaddam | G06F 16/353 706/12 |
| 2017/0212756 | A1* | 7/2017 | Ryali | G06F 8/60 |
| 2018/0032874 | A1* | 2/2018 | Sanchez Charles | G06F 16/367 |
| 2018/0131810 | A1* | 5/2018 | Yokel | G06N 7/005 |
| 2018/0275667 | A1* | 9/2018 | Liu | G01C 21/26 |
| 2018/0276562 | A1* | 9/2018 | Woulfe | G06N 3/0445 |
| 2018/0276912 | A1* | 9/2018 | Zhou | G05B 23/0275 |
| 2018/0315055 | A1* | 11/2018 | Pickover | H04L 9/3297 |
| 2018/0365913 | A1* | 12/2018 | Nix | G07C 5/0825 |
| 2019/0087746 | A1* | 3/2019 | Jain | G06Q 30/016 |
| 2019/0095495 | A1* | 3/2019 | Venkata Naga Ravi | G06F 16/24568 |
| 2019/0268214 | A1* | 8/2019 | Maes | G06F 11/3051 |
| 2020/0065220 | A1* | 2/2020 | Sobran | G06F 11/3608 |

OTHER PUBLICATIONS

Pingclasai, Natthakul et al., Classifying Bug Reports and Other Requests Using Topic Modeling 2012 20th Asia-Pacific Software Engineering Conference (Year: 2013).*
Bhattacharya, Pamela et al., Automated, highly-accurate, bug assignment using machine learning and tossing graphs The Journal of Systems and Software, vol. 85, 2012 (Year: 2012).*
Sohrawardi, Saniat Javid et al., A Comparative Study of Text Classification Algorithm on User Submitted Bug Reports IEEE, 2014 (Year: 2014).*
Pandley, Nitish et al., Automated classification of software issue reports using machine learning techniques: an empirical study Innovations System Software Engineering, vol. 13, 2017 (Year: 2017).*
TrackWise User's Guide Sparta Systems, Inc., 2000 (Year: 2000).*
Remedy Help Desk 5.5 User's Guide BMC Software, 2003 (Year: 2003).*
Tomas Mikolov, Ilya Sutskever et al, Distributed Representations of Words and Phrases and their Compositionality, 2013, arXiv:1310.4546.
Quoc Le, Tomas Mikolov, Distributed Representations of Sentences and Documents, 2014, arXiv:1405.4053.
Yoon Kim, Convolutional Neural Networks for Sentence Classification, 2014, arXiv:1408.5882.
Pieraccini, Roberto. The Voice in the Machine. Building Computers That Understand Speech. The MIT Press.
https://github.com/tesseract-ocr/.
Trevor Hastie, Robert Tibshirani, and Jerome H. Friedman, The elements of statistical learning, 2001, Springer.
Blei, David, Probabilistic Topic Models, Communications of the ACM, 2012, 55 (4): 77-84.
Christopher Manning, Hinrich Schutze , Foundations of statistical natural language processing, 1999, The MIT Press.
Mikolov, Tomas; et al. Efficient Estimation of Word Representations in Vector Space, arXiv:1301.3781.
LeCun, Yann. LeNet-5, convolutional neural networks. Retrieved Nov. 16, 2013.
https://github.com/dmlc/xgboost.

* cited by examiner

| Feature Name |
|---|
| Text_word_feature 1 |
| Text_word_feature 2 |
| ...... |
| Text_word_feature m |
| Text_syntactic_feature 1 |
| Text_syntactic_feature 2 |
| ...... |
| Text_syntactic_feature n |
| Text_semantic_feature 1 |
| Text_semantic_feature 2 |
| ...... |
| Text_semantic_feature p |
| Image_ocr_group ID 1 |
| Image_ocr_group ID 2 ... |
| Image_ocr_group ID q |
| Audio |
| Video |
| Submission time |
| Submission city |
| Submission channel |
| User_comment # |
| User_comment_positive # |
| User_comment_negative # |
| User_visit # |
| User_click # |
| User_purchase # |

FIG. 5

| | Text_word _feature 1 | ... | Text_syntactic _feature 1 | Text_semantic _feature 1 | ... | Image_ocr_grou p ID 1 ... | Image_ocr_group ID q | Audio | Video |
|---|---|---|---|---|---|---|---|---|---|
| Feedback 1 | | | | | | | | | |
| Feedback 2 | | | | | | | | | |
| ... | | | | | | | | | |
| Feedback i-1 | | | | | | | | | |

| Submission on time | Submission on City | Submission channel | User_comment # | User_comment _positive # | User_coment_ negative # | User_visit # | User_click # |
|---|---|---|---|---|---|---|---|
| ... | | | | | | | |
| ... | | | | | | | |
| ... | | | | | | | |
| ... | | | | | | | |

FIG. 6

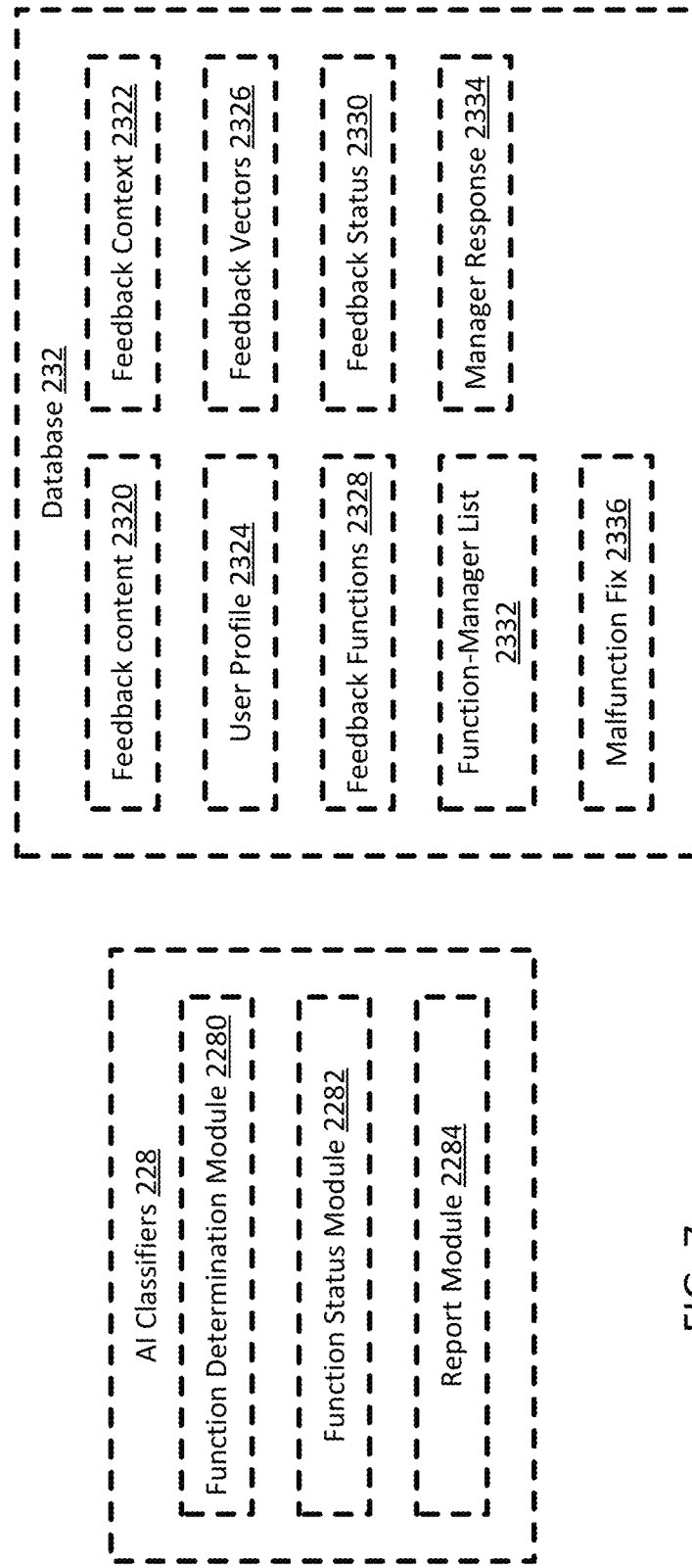

SYSTEM AND METHOD FOR MONITORING ONLINE RETAIL PLATFORM USING ARTIFICIAL INTELLIGENCE AND FIXING MALFUNCTION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to monitoring health status of an e-commerce platform, and more particularly to system and methods for real time monitoring health of online retail platforms via deep learning based on feedbacks from users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce has undergone a hyper growth for years. Giant online retail platforms such as Amazon, Alibaba and JD, have hundreds of millions of active users and a gross revenue to billions. Moreover, both the revenue and the user number grow rapidly (taking JD as an example, 40% quarterly growth of business volume in Q2 2017).

On the one hand, the huge business volume came with massive usage of the online retail platform (mobile app and website). The massive usage proposes challenges to the availability and stability of the platform. Thus, an unaware breakdown of the platform will be hazardous to user experience, revenue and public reputation, leading to severe financial and social consequences.

On the other hand, the hyper growth is owed to rapidly increasing functions and/or features of the website. On an online retail website, there are hundreds of merchandise product channels, and a series of functions including search, recommendation, shopping cart, delivery, and payment. All these functions and channels are developed or owned by different teams inside the company. The functions usually overlap with each other and more often be upstream or downstream dependency of each other. This complication creates barrier for each team to know exactly the health status of its owned function, diagnose errors and provide solutions.

Therefore, an unaddressed need exists in the art to address the aforementioned deficiencies and inadequacies.

SUMMARY

In certain aspects, the present disclosure relates to a method for monitoring health of an e-commerce platform. In certain embodiments, the method includes: receiving, by a computing device, a feedback submitted by a user through the e-commerce platform; generating, by feedback processors of the computing device, a vector based on content of the feedback, context of the feedback and profile of the user; and classifying, by classifiers of the computing device, the vector to obtain a function of the e-commerce platform corresponding to the feedback and a status of the function, and preparing an alarm when the status is malfunction. The content includes at least one of text, voice, image and video; the context includes at least one of time of submitting the feedback, location of submitting the feedback, and submission channel of the feedback; and the user profile includes at least one of attributes of the user, purchasing history of the user, and preference of the user using the e-commerce platform. The vector has a pre-determined number of dimensions, and each of the text, the voice, the image, the video, the time of submitting the feedback, the location of submitting the feedback, the submission channel of the feedback, the attributes of the user, the purchasing history of the user, and the purchasing preference of the user corresponds to at least one of the dimensions of the vector.

In certain embodiments, the feedback processors and the classifiers are performed using at least one artificial intelligence model.

In certain embodiments, wherein the step of generating the vector comprises: processing the content using the feedback processors to obtain content dimensions of the vector corresponding to the text, the voice, the image, and the video. In certain embodiments, the method further includes: cleaning the content before processing the content to obtain the content dimensions of the vector. In certain embodiments, the method further includes: separating the image to text of the image and background image, processing the text of the image to obtain an image text result and processing the background image to obtain a background image result, and integrating the image text result and the background image result to obtain the content dimension of the vector corresponding to the image.

In certain embodiments, the method further includes: sending the alarm to a manager of the e-commerce platform responsible for the function, receiving an instruction corresponding to the alarm from the manager when the alarm is false, and re-train the feedback processors and the classifiers using the instruction.

In certain embodiments, the classifiers are trained using a plurality of historical feedbacks and a function category structure, the function category structure comprises: a tier-1 category comprising website of the e-commerce platform, application of the e-commerce platform, and external links to the e-commerce platform. In certain embodiments, the tier-1 category of the website comprises tier-2 categories of: product page, shopping cart, and payment; the tier-2 category of the product page comprises tier-3 categories of: product description, product search, and product recommendation.

In certain embodiments, the classifiers comprise a plurality of classification models, each classification model provides a candidate function based on each of the historical feedbacks, and the candidate functions provided by the classification models are used by an ensemble model to determine the function corresponding to each of the feedback In certain aspects, the present disclosure relates to a system for monitoring health of an e-commerce platform. In certain embodiments, the system includes a computing device. The computing device has a processor and a storage device storing computer executable code. The computer executable code, when executed at the processor, is configured to perform the method described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 5 schematically depicts a feature vector according to certain embodiments of the present disclosure.

FIG. 6 schematically depicts a feature matrix according to certain embodiments of the present disclosure.

FIG. 7 schematically depicts AI classifiers according to certain embodiments of the present disclosure.

FIG. 8 schematically depicts a database according to certain embodiments of the present disclosure.

DETAILED DESCRIPTION

Figure 1:
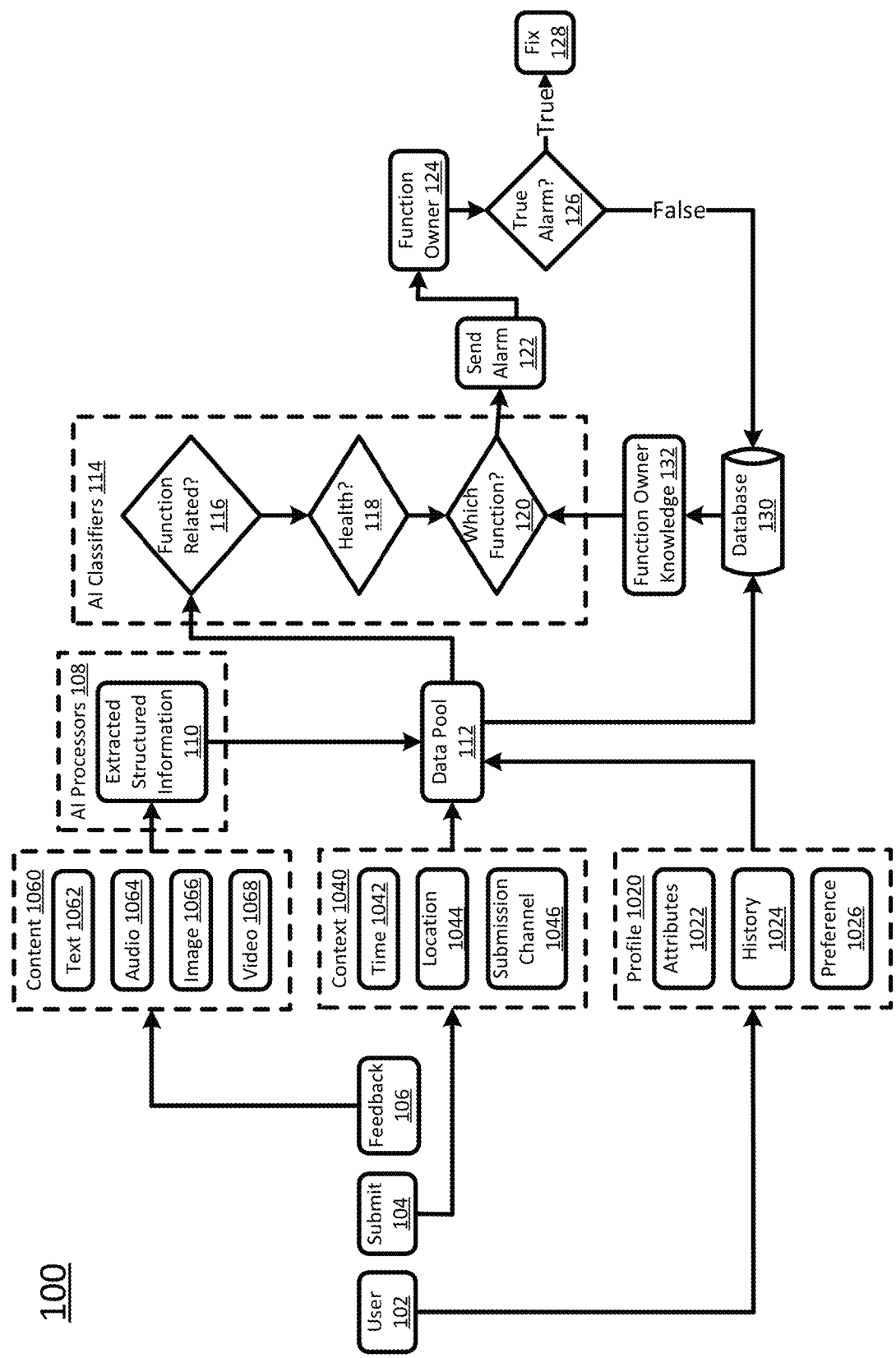
FIG. 1 schematically depicts a workflow of an e-commerce platform monitoring system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As described above, there is a need to accurately monitor health of an e-commerce platform. In certain embodiments, a monitor method is to make the platform running log and set metrics to monitor, i.e. if number of clicks increased drastically within a short period of time, it may be a malfunction and an alarm is sent. However, the metrics is affected by many other factors besides the malfunction. For example, the increasing number of clicks may be due to business growth or holidays, instead of malfunction. Hence, a more straightforward, accurate information source to monitor the health status is demanded.

In certain embodiments, user's feedback is regarded as the information source. However, the traditional way of manually checking user feedback is not applicable to giant online retail platform. The platform has hundreds or even thousands of functions, and thus it is hard for people to remember all the definition and subtle difference, not to mention giving accurate response. Moreover, the latency is high since people need time to understand the feedback, check references and respond. Last, the cost is high to maintain a huge team.

In certain aspects, the present disclosure provides a self-sufficiency, self-refining system, to monitor health status of online retail platform. By utilizing user's feedback and integrating them with knowledges about the platform, the system is able to detect function issues in a timely, accurate and automatic manner, via harnessing the power of artificial intelligence (AI) including natural language processing, computer vision, and machine learning.

In details, the system established a knowledge base about the e-commerce companies' team structure, app function structure, and the correspondence between these two. Meanwhile, the system instantly parse user feedback, in various format (texts, voice, images, video), and extract useful information from them via AI technologies. Finally, the system combine the two information source to make judgement—send alarms to particular team to fix reported issues. The information extracted from feedbacks includes: which function is unhealthy, and which action should be taken to fix it. The actions include: find the team who owns this function, notify the team it is problematic, and give the reason and suggest actions.

In certain embodiment, the disclosure related to a software system that embeds AI technologies to enable instant, accurate health monitoring of online retail platform based on user feedback. The various format of feedback entails the uniqueness of how AI technologies are used here—there is a big variety of inputs (structured data, unstructured data, text, image audio, video) and thus the system has intensive ensemble methods to integrate all the different format of data, to create the most accurate issue reports.

FIG. 1 schematically shows a global workflow of the software system according to certain embodiments of the present disclosure. As shown in FIG. 1, the user 102 performs an activity 104 of submitting a feedback 106. The submitted feedback has multimedia content 1060, including text 1062, audio or voice 1064, image 1066, and video 1068. The system records context 1040 of the submission, including time 1042 of submitting the feedback, location 1044 where the user submits the feedback, and submission channel 1046 of the submission. The submission channel includes application (APP) or website. The submission is related to a user identification (ID), and the system can access user profile 1020 based on the user ID identified, includes attributes 1022, history 1024, and preference 1026. The attributes 1022 includes registered information of the user, such as gender, age, hobby, mail address. The history 1024 includes the purchase history of the user and optionally feedback history of the user or other activities of the user using the e-commerce platform. The preference 1026 includes the user's preference using the website, such as product he is interested in based on his search history. Content data are first processed via AI processors 108 and transferred to structured data. The data pool 112 stores the structured data from the AI processors 108, the context data 1040 of submissions, and the profile data 1020 of the users, and is configured to integrates the structured data from the AI processors 108, the context 1040 related to the feedback submission, and the profile 1020 related to the feedback submission to form a vector or a matrix of one or more feedbacks. When the system is trained, a matrix is generated based on many feedbacks. When the system is used for monitoring, a vector may be generated for each feedback, and the feedback is then analyzed to determine its function and health status. After generation or integration of the vector or matrix, the profile 1020 then sends the vector or matrix to the AI classifiers 114. The machine learning classifiers 114 are applied to predict whether the feedback(s) 106 is function related at step 116, if it's function related, to predict whether the function is healthy at step 118, and to predict which function has problem at step 120. The system then match the responsible owner or manager of the function based on the function owner knowledges 132 and sends a malfunction report or alarm 122 to the responsible owner 124 of that function. When the function owner determines at step 126 that the alarm is true, he fixes the malfunction at step 128. If the alarm is false, the function owner sends the false alarm to the database 130, and provide the false alarm to the function owner knowledge 132, so as to use the updated function owner knowledge to retrain the AI classifiers 114. The data pool 112 and the database 120 may be one integrally formed database, which includes the context 1040 of the historical feedbacks, the profile 1020 of the platform users, the matrix and vectors generated by the AI processor 108, the function labels of the feedbacks (either manually added or generated during training of the AIs), etc.

During the process, AI technologies are used for processing raw content and make decisions. In terms of AI, the data acquisition is indispensable to the success of the AI models. In certain embodiments, the system stores massive amount of historical data in the database to train the AI models. Further, online training mechanism is enabled—once AI made a mistake, e.g., send a false alarm, the mistake information will be immediately sent back AI models for an online retrain. Accordingly, the system is real-time self-refined.

Figure 2:
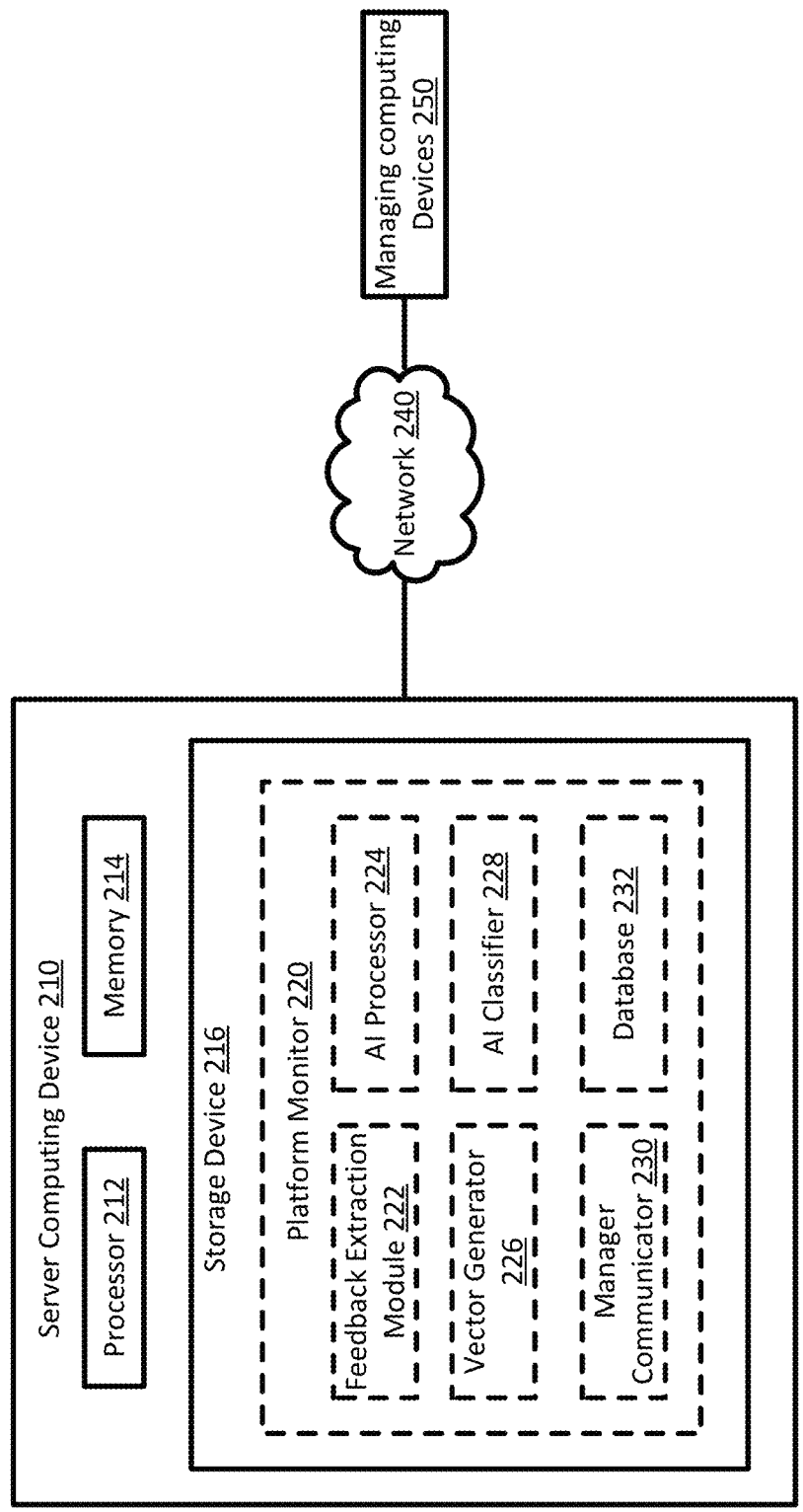
FIG. 2 schematically depicts an e-commerce platform monitoring system according to certain embodiments of the present disclosure.

FIG. 2 schematically depicts a health monitoring system for an e-commerce platform according to certain embodiments of the present disclosure. The system 200 shown in FIG. 2 and the system 100 shown in FIG. 1 are different ways of showing the same or similar system. As shown in FIG. 2, the system 200 includes a server computing device 210, multiple managing computing devices 250, and a network 240 connecting the managing computing devices 250 with the server computing device 210.

The server computing device 210 may function as a server or a host computer. In certain embodiments, the server computing device 210 may be a cloud computer, a server computer, a cluster, a general-purpose computer, or a specialized computer, which provides platform monitoring service. In certain embodiments, the managing computing devices 250 may be cloud computers, mobile devices, tablets, general-purpose computers, headless computers, wearable devices, or specialized computers, which receive alarms form the server computing device 210 and in response to the alarm, sends evaluation of the alarm to the server computing device 210. In certain embodiments, the network 240 may be a wired or wireless network, and may be of various forms, such as a public network and a private network. Examples of the network may include, but not limited to, the LAN or a wide area network (WAN) including the Internet. In certain embodiments, two or more different networks and/or interfaces may be applied to connect the server computing device 210 to the user computing devices 250. In certain embodiment, the interface 240 may also be a system interface, a universal serial bus (USB) interface.

As shown in FIG. 2, the server computing device 210 may include, without being limited to, a processor 212, a memory 214, and a storage device 216. In certain embodiments, the server computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the server computing device 210. The processor 212 can execute an operating system (OS) or other applications of the server computing device 210. In some embodiments, the server computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the server computing device 210. In certain embodiments, the memory 214 may be a volatile memory array. In certain embodiments, the server computing device 210 may run on more than one memory 214. The storage device 216 is a non-volatile data storage media for storing the OS (not shown) and other applications of the server computing device 210. Examples of the storage device 216 may include non-volatile memory such as flash memory, memory cards, USB drives, hard drives, floppy disks, optical drives, solid-state drive (SSD), or any other types of data storage devices. In certain embodiments, the storage device 216 may be a local storage, a remote storage, or a cloud storage. In certain embodiments, the server computing device 210 may have multiple storage devices 216, which may be identical storage devices or different types of storage devices, and the applications of the server computing device 210 may be stored in one or more of the storage devices 216 of the computing device 210. As shown in FIG. 2, the storage device 216 includes a platform monitor 220. The platform monitor 220 provides a service for monitoring an e-commerce platform using feedbacks from users or customers.

The platform monitor 220 includes, among other things, a feedback extraction module 222, AI processors 224, a vector generator 226, an AI classifier 228, a manager communication module 230, and a database 232. In certain embodiments, the platform monitor 220 may include other applications or modules necessary for the operation of the modules 222-232. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the platform monitor 220 may be located at a remote computing device or a cloud device.

The feedback extraction module 222 is configured to, retrieve or receive a feedback submitted by a user of an e-commerce platform, extract content from the feedback, and send the extracted content to the AI processor 224. The content of the feedback includes at least one of text, audio or voice, image, and video.

In certain embodiments, during training of the platform monitor 220, the feedback extraction module 222 is configured to retrieve and extract historical feedbacks stored in the database 232. To ensure efficient training of the platform monitor 220, the feedback extraction module 222 may provide only high-quality historical user feedbacks. Those raw texts, images, audio, video are collected from everyday operation, and all the data are stored in internal database and ready for use in training AI algorithms.

In certain embodiments, during operation of the platform monitor 220, new feedbacks are added to the database 232, and the platform monitor 220 is configured to check the database 232 in a short pre-determined time interval, and process the newly added feedbacks as a batch.

In certain embodiments, the platform 220 checks feedbacks at real time, and the feedback extraction module 222 is configured to receive one feedback at a time and send the extracted content of the one feedback to the AI processor 224.

Figure 3:
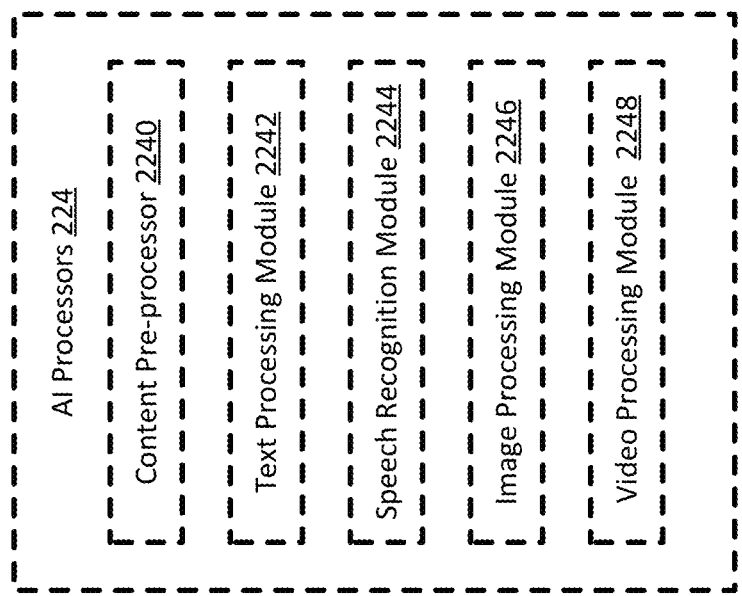
FIG. 3 schematically depicts AI processors according to certain embodiments of the present disclosure.

The AI processor 224 is configured to, upon receiving the content from the feedback extraction module 222, transform the content into structure content data, such as a content vector or a content matrix. Referring to FIG. 3, the AI processor 224 includes a content pre-processor 2240, a text processing module 2242, a speech recognition module 2244, an image processing module 2246, and a video processing module 2248.

The content pre-processor 2240 is configured to remove noise from the content, so as to provide cleaned data to the text processing module 2242, the speech recognition module 2244, the image processing module 2246 and the video processing module 2248. The text processing module 2242 is configured to, upon receiving the cleaned text, transform the text into numeric values. The speech recognition module 2244 is configured to, upon receiving the cleaned audio, recognize text from the audio, and transform the recognized text into numeric values. The image processing module 2246 is configured to, upon receiving cleaned image(s), separate the image into text and background image (image portion with text removed from the image), respectively process the text and background image, and integrate the results to numeric values. The video processing module 2248 is configured to, upon receiving the cleaned vide, separate the images of the video into text and background image, process respectively the texts and the background images, and integrate them to obtain numeric values. Those values from processing the content, are defined as dimensions of the content vector when processing one feedback, and are defined as dimensions of the content matrix when processing multiple feedbacks (such as during training).

In certain embodiments, the text processing module 2242 is configured to, upon receiving the cleaned text from the content-processor 2240, obtain features or numeric values for the text. Specifically, the text processing module 2242 first partitions each text as a sequence of words, and then featurizes the words as dimensions of the content vector, representing word occurrence, word co-occurrence, word class, name entity, sentence syntactic structure and words' semantic meaning [8]. Many technologies may be used: for example, n-gram and tfidf are used to denote word occurrence [8], word2vec [9] is used to represent word by its contexts (co-occurrence with other words) [8], POS and name entity recognition is used to find word class and name entity of the word, syntactic analysis and semantic analysis are further applied to get the word's syntactic role and semantic meaning [8]. During training, the featurization leads to a big matrix, with columns as the above-mentioned features and rows as feedbacks. The processing of multiple texts is used for training the model or using the model. During operation, when the application processes new feedbacks as batch, the featurization of the batch of feedbacks also leads to a matrix. During operation, when the application processes new feedbacks one by one, the text processing module 2242 may also process the one feedback to result dimensions of a vector.

In certain embodiments, the image processing module 2246 is configured to, upon receiving image(s) from the content pre-processor 2240 (or from the feedback extraction module 222 if no data cleaning is needed at this stage), obtain features or numerical values of the image. Specifically, the image processing module 2246 separates the image into text extracted from the image (image text) and background image, processes the image text and the background image separately, and integrate the two to obtain numerical values. In certain embodiments, the image process module 2246 applies techniques based convolutional neural network [10] or deep neural network, to represent the background images as meaningful content vector dimensions.

Figure 4:
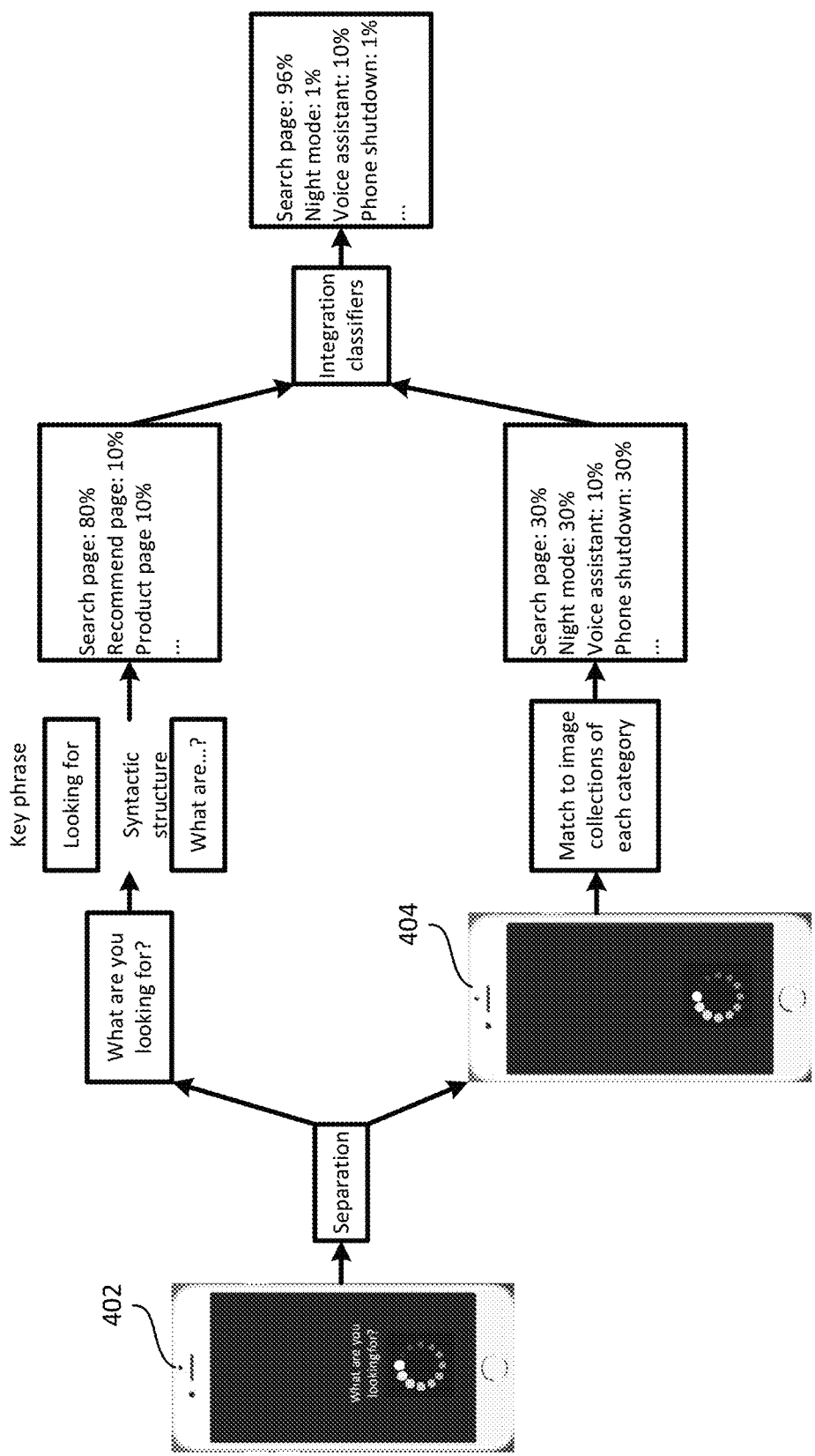
FIG. 4 schematically depicts an image processing procedure according to certain embodiments of the present disclosure.

FIG. 4 schematically shows an example of obtaining content vector dimensions of an image. As shown in FIG. 4, a screenshot 402 of a phone screen is provided in a feedback. First, the image processing module 2246 separates the original image 402 into two parts, the image text of "What are you looking for" and the background image 404 with the image text removed. The extraction of the image text may be performed using OCR method trained on internal data. Using the extracted text box and their coordinates in the image, the text box is extracted out, and the background image is obtained. Then the image processing module 2246 processes the image text to find keywords "looking for" and the syntactic structure "What are . . . ?" In certain embodiments, the keywords is selected by tfidf+ngram, while syntactic structure is selected by matching the image text to predefined domain-specific structures. In certain embodiments, to predefine sentence structures, all image texts extracted from images in training data are collected. Then the image texts are cut into sentences. Taking each pair of sentences, a similarity score between the two sentences are calculated in terms of the words in them. Specifically, taking each sentence as a set of words S={w}, the similarity between sentence i and sentence j is defined as:

$$s(i,j) = |S_i \cap S_j|$$

Using this similarity score, a clustering method, K-means is used to separate the sentences in training data into M groups: $G_1, \ldots, G_M$. M is pre-defined based on estimated number of syntactic structures in the text corpus. Each group has sentences with similar word vector. For a new sentence k, its closest group is calculated using:

$$G(k) = \mathrm{argmin}_{G1, \ldots, GM}(\Sigma_{i \in Gm} s(k,i))$$

Following similar procedures, background images are featured into vectors based on their image representation via, for example, AutoEncoder method. Then similarity between background images are defined as cosine similarity and the background images are separated into groups. For a new image, its closest image group can be obtained. As shown in FIG. 4, a possibility of groups are obtained based on either image text or background image, and the two results can be integrated to obtain a more accurate estimation of the group or related function of the original image. In certain embodiments, the OCR texts' and background images' group ID are used as additional features, concatenated after the text dimension(s) of the content vector or content matrix. As the result shown in FIG. 4, the result from the performance of the image processing module 2246 gives the search page a 96% possibility, which may form a corresponding dimension value 1 of the content vector or content matrix corresponding to the group ID of "search page."

Audio can be recognized to obtain text, and video can be separated into images, and the processing of the audio and the video is similar to the procedure described above in related to the text and the image.

The vector generator 226 is configured to, upon receiving the content vector or content matrix from the AI processor 224, retrieve the numeric value(s) of the context and the numeric value(s) of the user profile, append the values to the content vector or content matrix, to form a vector or matrix. In certain embodiments, the context and the profile are stored in the database 232. In certain embodiments, if the numeric values of the context and the user profile are not available in the database 232, the vector generator 226 is further configured to transform the context and user profile into numerical values. In certain embodiments, the transformation is performed using dummy variables. For example, if there are 100 cities for the location 1044 of a submission, 100 dummy variables are provided to denote them, respectively. If the city is "Beijing" (the first city, for instance), then the first dummy variable is set to 1 while the other dummy variables are set to 0. In certain embodiments, the vector generator 226 may also be a part of the AI processors 224.

FIG. 5 schematically shows a vector or (or named feature vector) of a feedback generated by the vector generator 226 according to certain embodiments of the present disclosure. As shown in FIG. 5, the vector includes features from the text, the image, the context of the submission and the user profile. The image features includes image text feature and the background image feature. In certain embodiments, the vector include a pre-determined number of dimensions. As shown in FIG. 5, the vector includes m+n+p+q+8 dimensions, wherein each of m, n, p and q are positive integers. In certain embodiments, the vector includes about 5,000 dimensions, and most of the dimensions correspond to words or phrases from the text 1062. The feature dimensions shown in FIG. 5 is for description only and may be varied during operation. For example, the time may be divided into dimensions of season, month, weekday, hour of the day, and each of the dimensions are defined using a dummy variable. In certain embodiments, each of the location, submission channel, attributes is defined by a dummy variable. In certain embodiments, the history of the user refers to the complain history and the history of how active the user uses the website, and the history is defined by one or more real numbers. After the vector is generated, the feature vector generator 226 sends the vector to the AI classifier 228 to make decisions—notify the malfunction.

During training or batch processing, the vector generator 226 is configured to generate a matrix (or named feature matrix) instead of a vector. FIG. 6 schematically show a matrix of feedbacks according to certain embodiments of the disclosure. As shown in FIG. 6, each row of the matrix is a vector corresponding to one feedback. Each row includes text features (word feature, syntactic feature, semantic feature), image text feature, background image feature, context features, and user profile features, those features are represented by values, and the values in one row are dimensions of the vector corresponding to that feedback. In certain embodiments, a feedback in a row may not have corresponding features for each dimension, and the dimensions the feedback lacks are given a value 0. Kindly note each row of the matrix shown in FIG. 6 includes similar information as the vector shown in FIG. 5.

The AI classifier 228 is configured to, upon receiving the vector/matrix from the vector generator 226, determine whether the feedback relates to a function of the e-commerce platform, the status of the function, and which function. Referring to FIG. 7, the AI classifier 228 includes a function determination module 2280, a function status module 2282, and a report module 2284. The function determination module 2280 is configured to use various classification models to process the vector/matrix, to obtain one or more functions related to the vector (or each row of the matrix), and send the function(s) to the function status module 2282. Typically, the function determination module 2280 only selects one function as the result for each vector. The function status module 2282 is configured to, upon receiving the determined function, evaluate whether the function is healthy or not based on the vector. When malfunction presents, the function status module 2282 is configured to send the malfunction result to the report module 2284. In certain embodiments, the function status module 2282 may also determines that the status of the function is not related to the function of the operation of the platform, but related to a product itself, it may then send the result to the product department to take care of the feedback accordingly.

The report module 2284 is configured to, upon receiving the malfunction status from the function status module 2282, retrieve the function determined by the function determination module 2280, and send the function and the status of the function to the manager communicator 230. In certain embodiments, the function status module 2282 may send the function and the status of the function directly to the manager communicator 230, and a separate report module 2284 is not needed.

The manager communicator 230 is configured to, upon receiving the function and the status of the malfunction, match the function to the manager based on the manager-function relationship (or function owner knowledge) stored in the database 232, prepare an alarm based on the determined function and the status of the malfunction, match the function to the manager of the function, and send the alarm to the manager. The manager of the function, upon receiving the alarm, fix the malfunction when it's his responsibility. If the malfunction is not related to the manager or not the responsibility of the manager, the manager would send back a response to the manager communicator 228. The manager communicator 228 then stores the response to the database 232. The updated database 232 can then be used to retrain the AI processors 224 and the AI classifiers 228. In certain embodiments, the response form the manager may also be stored directly to the database 232.

The database 232 includes data for training and using the AI processor 224 and the AI classifier 228. Referring to FIG. 8, the database 232 includes feedback content 2320, feedback context 2322, user profile 2324, feedback vectors 2326, feedback functions 2328, feedback status 2330, function-manager list 2332, manager response 2334, and feedback fix 2334. The feedback content 2320 includes high quality historical feedbacks from users and new feedbacks to be processed by the platform monitor 220. The feedback context 2322 stores the context of submitting the feedbacks. The user profile 2324 includes profiles of the users, which may include all the users registered to the e-commerce website, or only the users that have submitted feedbacks. The feedback vectors 2326 stores the feedback vectors of the historical feedbacks, which can be used for training the AI processors 224. The feedback functions 2328 includes groups of functions corresponding to the historical feedbacks. The feedback status 2330 includes a group of status corresponding to the historical feedbacks. The function-manager list 2332 lists the correspondence between the functions and the managers responsible for the functions. The manager response 2334 includes responses from the managers about false alarms generated by the manager communicator 230. The malfunction fix 2336 stores the method of solving a malfunction, when available. The data in the database are indexed by identifications, such as user ID registered by the user or session ID of activities, and the data can be retrieved using those identifications.

In certain embodiments, the databased 232 includes data for the training of the platform monitor 220. In certain embodiments, the database 232 also includes data that are used during the operation of the platform monitor 220. In certain embodiments, the database 232 may not include all the above listed components, and some data listed in the database 232 may be stored in other servers or computing devices, and are accessible by the platform monitor 220 during operation. For example, the function-manager list 2332 may be stored in another device that is accessible by the manager communicator 230; and the feedback fix 2336 may be stored by the respective mangers. In certain embodiments, the database 232 may include other documents necessary for the operation of the platform monitor 220. In certain embodiments, once a new feedback is analyzed, the corresponding feature vector generated by the AI processor 224, the function and status determined by the AI classifier 228, and optionally the manager response are stored in the database 232 to update the database 232. In certain embodiments, the AI processors 224 and the AI classifiers 228 are retrained regularly or retrained every time a false alarm is generated.

Figure 9:
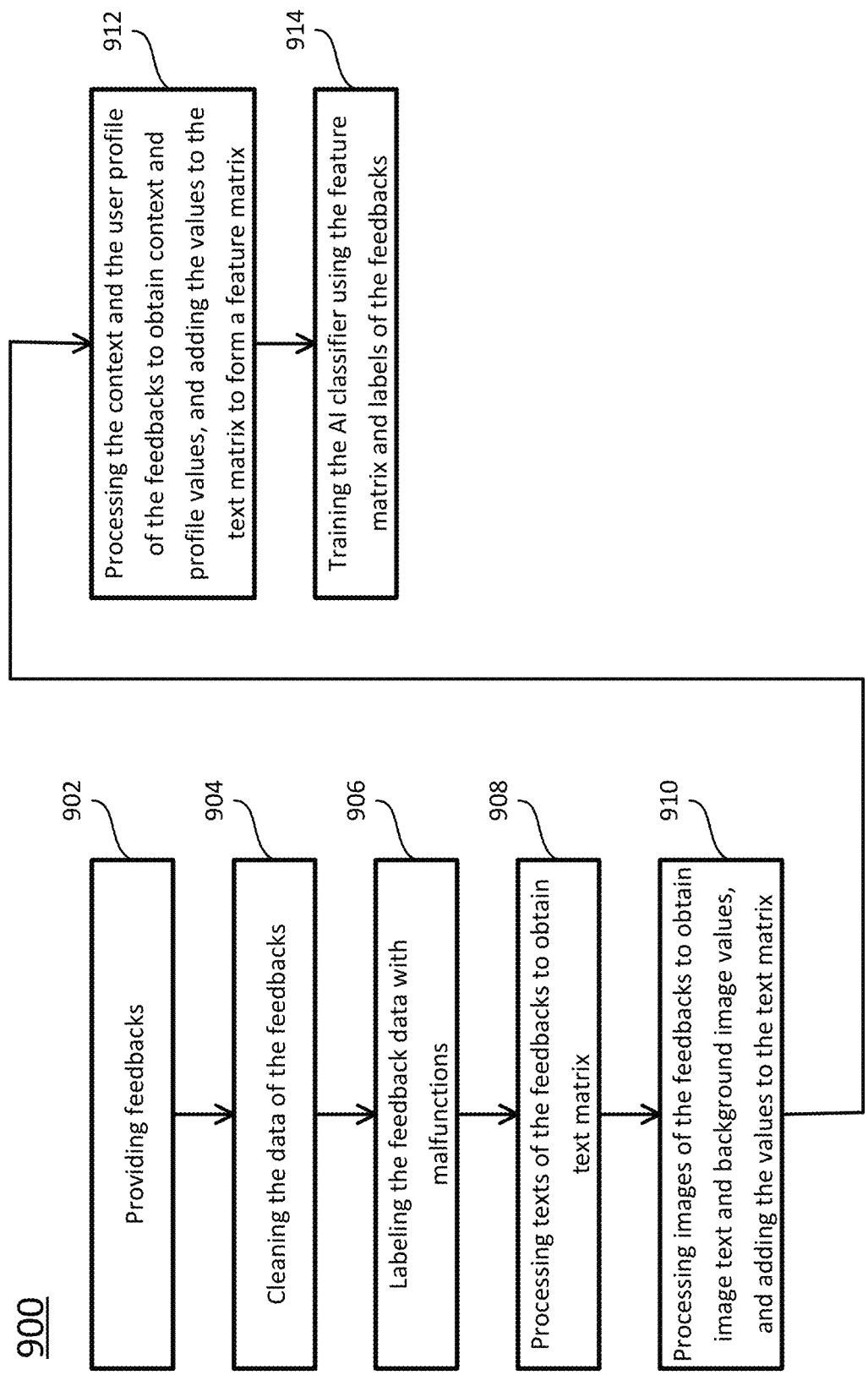
FIG. 9 schematically depicts a method for training an e-commerce platform monitoring system according to certain embodiments of the present disclosure.

FIG. 9 schematically shows a method of training the AI processors and the AI classifiers according to certain embodiments of the present disclosure. In certain embodiments, the method is implemented by the server computing device 210 shown in FIG. 2. In certain embodiments, the AI processors and the AI classifier are trained independently, where the output of the AI processor, the feature vectors of historical feedbacks, are used as input for the AI classifier. It should be particularly noted that, unless otherwise stated in the present disclosure, the steps of the method may be arranged in a different sequential order, and are thus not limited to the sequential order as shown in FIG. 9.

At procedure 902, high-quality historical user feedbacks are provided. Raw texts, images, audio, video are collected from every day operation of the e-commerce platform. All the data are stored in the internal database, such as the database 232 and ready for use in training AI algorithms. In certain embodiments, the procedure 902 is performed by the feedback extraction module 222.

At procedure 904, the raw feedback data are cleaned to remove noises. In certain embodiments, the procedure 904 is performed using the content pre-processor 2240 or any other independent modules, which may be an AI model. The raw texts, images, audio, and video are noisy, and some of the data are not related to malfunctions. For example, users typed non-informative characters, uploaded nonsense or low-quality images/videos. In certain embodiments, one or more AI models are trained to recognize the noisy patterns and remove the noises accordingly. In one embodiment, natural language processing is used to match noisy texts and remove them. In one embodiment, images having complicated, noisy background are removed, because such images are usually not screenshots which reflect app/website errors.

Further, the key information usually is only a small part of raw content and thus information extraction is critical. Video is divided into audio and images. Audio is transferred to texts [4]. Texts in images are extracted [5] and image backgrounds are left. This is due to the fact that most users submit images as screenshots when the app breakdown.

After that, the cleaned images and texts are stored in database along with context features such as timestamp, location of feedback submission and submission channel, and user profile features. They together form the training data of the platform monitor 220, specifically the AI processors 224 and the AI classifiers 228.

At procedure 906, the data are labeled. In addition to feedback, label of the feedback is also indispensable to success of AI [6]. The label establishes the connection between feedback and their usage—the malfunction of the online retail platform.

Referring back to FIG. 1, we need to map malfunctions with particular teams. Hundreds of categories are defined, each denotes one unique function issue. The quality of label impacts the accuracy of AI trained on it, so it has to be of high quality. In certain embodiments, the label are obtained from historical platform malfunction reports—from a group of professionals with years of experiences on manually labeling user feedbacks.

In certain embodiments, the functions of an online retail platform is defined with a tree structure, with several tier-1 function module divided into multiple tier-2 modules, and each tier-2 module further divided into multiple tier-3 modules, and so on and so forth. There are hundreds of modules serving like leaves of the tree. With the labeling structure and training, the AI can learn how to label an incoming feedback to one of the leaves.

In certain embodiments, AI processors are fixed for a feedback, and parameters of the AI classifiers are adjusted to refine the AI classifier according to the quality of the result, where the result may be the percentage of the correct alarm generated by the AI classifiers; in other embodiments, AI classifiers are fixed, and parameters of the AI processors are adjusted to refine the AI processor according to the quality of the result, where the result may be the percentage of the correct alarm generated by the AI classifiers. In certain embodiments, the above method can also be used to select a suitable AI model for a part of the platform monitor 220, that is. In other words, by fixing the AI classifiers and varying one of the AI processors, a suitable AI processor model can be selected; and by fixing the AI processors and varying one of the AI classifiers, a suitable AI classifier model can be selected.

Figure 10:
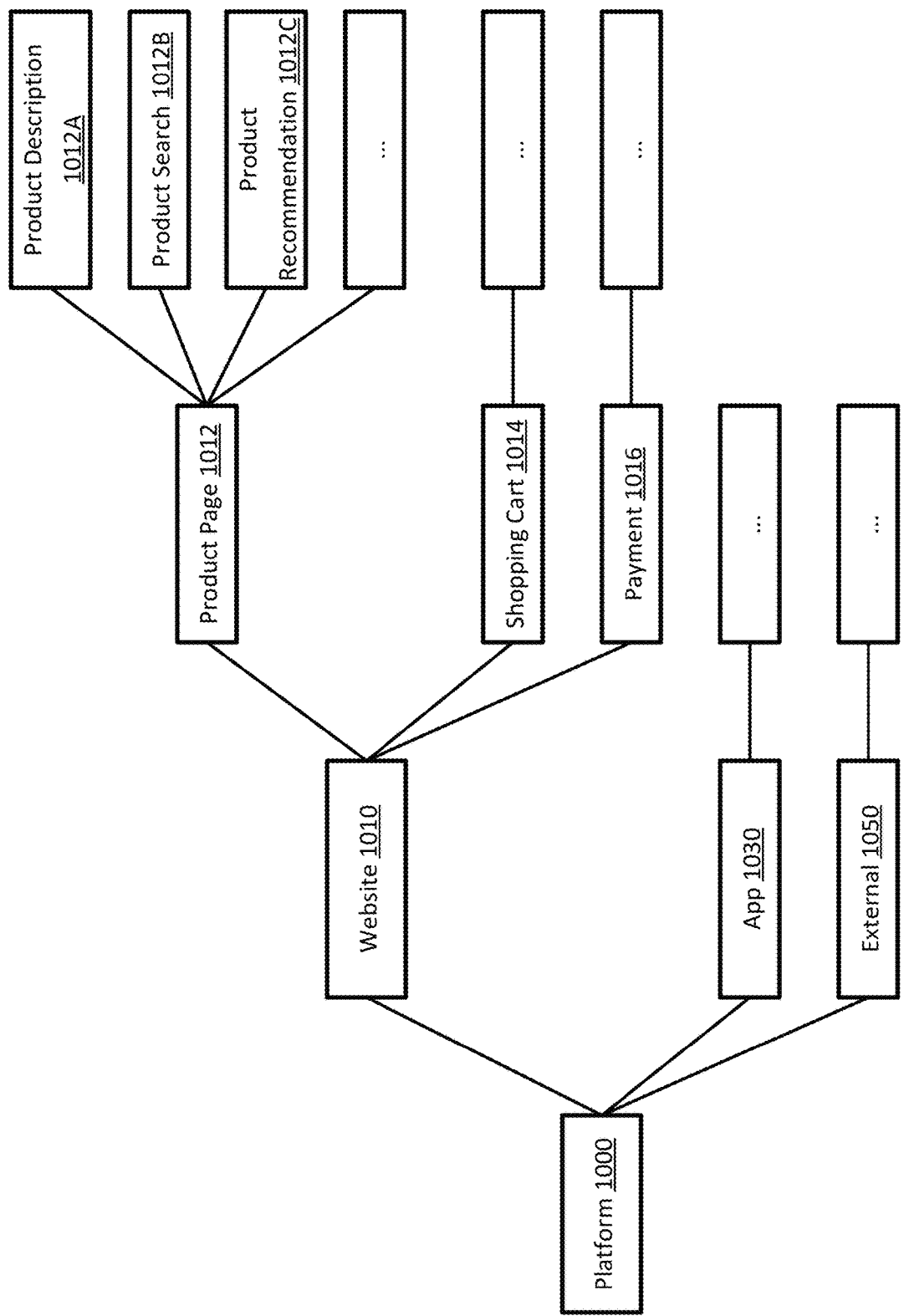
FIG. 10 schematically depicts structure of functions according to certain embodiments of the present disclosure.

FIG. 10 schematically shows a structure of functions to monitor according to certain embodiments of the present disclosure. As shown in FIG. 10, a function structure of the platform 1000 being monitored includes three tires. The platform 1000 may be an e-commerce platform. Tier-1 modules of the platform 1000 include the website 1010 of the e-commerce platform, the App 1030 such as a smart phone application, and the external 1050 such as a third party service in communication with the e-commerce platform. The tier-1 modules here are submission channels for the feedbacks of the platform. The tier-1 module, website 1010 includes three tier-2 modules—the product page 1012, the shopping cart 1014, and the payment 1016. The three tier-2 modules of the website 1010 may be visited sequentially by a user and shown in different web pages. For example, the user may browse the product page 1012 and find the product he is interested in, add the product to the shopping cart through the shopping cart function 1014, review the shopping cart, and make payment through the payment function 1016. The tier-2 module product page 1012 further includes four tier-3 modules, which includes product description 1012A, product search 1012B, the product recommendation module 1012C, and other related modules. The three tier-3 functions are related to the product directly, and may be shown in the same web page.

In certain embodiments, the label categories are manually defined, and thus it is not perfect. There are categories not defined yet and new categories keep coming out—when new functions are developed for the platform.

For the former, we collect feedbacks not classified to any of pre-defined categories as "unknown feedbacks". There are usually multiple unknown categories, so we have to further partition unknown feedbacks into subgroups via unsupervised machine learning [6]. Extract the topic information using topic modeling (natural language processing techniques [7]), and have human intervention to define those undefined categories.

For the latter, we followed similar procedure. The only difference is that new categories usually do not have many feedbacks. So their feedbacks are "left overs" after the former step—these feedbacks are not associated with any defined categories. Finally, we map newly launched functions and match them with the those left overs.

After the data are labeled, at procedures 908-912, the cleaned raw contents of the feedbacks are transformed to numeric values. The values, together with the context features and user profile features, are integrated to form a matrix (feedback vectors) corresponding to the feedbacks. Those procedures 908-912 are performed to train the AI processors 224.

At procedure 908, the text processing module 2242 receives texts of the feedbacks, and in response, processes the texts to obtain features or numeric values for those texts. In certain embodiments, the text processing module 2242 splits each text as a sequence of words, and then transforms each word as numbers, representing word occurrence, word co-occurrence, word class, name entity, sentence syntactic structure and words' semantic meaning. Those numbers are respectively dimensions of a feature vector for each feedback. In certain embodiments, the featurization of those words of multiple feedbacks leads to a big matrix, with columns as the above-mentioned features and rows as feedbacks. The matrix is called text matrix.

At procedure 910, the image processing module 2246 receives images of the feedbacks, and transform the images to numerical values. Specifically, the image processing module 2246 separates the image into text extracted from the image (image text) and background image (image without the text), processes the image text and the background image separately, and integrate the results to obtain numeric values, and add the values as new dimensions of the text matrix. In certain embodiments, the audios and videos are transformed to texts and images, and processed similarly to obtain their respective values. Those values are added to the text matrix as new dimensions of the vector, where each row corresponding to one feedback and is regarded as the vector for that feedback. In certain embodiments, when the feedback only includes text, the procedure 908 is sufficient and the procedure 910 is not necessary.

At procedure 912, the vector generator 226 extract information from the context and the user profile of the feedbacks, transform the information to values, and add the values to the text matrix, to form a matrix of the feedbacks (or named feature matrix). Referring back to FIG. 6, a matrix of the feedbacks according to certain embodiments of the disclosure is shown. The rows of the matrix are vectors of the feedbacks. Each row (the vector for each feedback) includes text features (word feature, syntactic feature, semantic feature), image text feature, background image feature, context features, and user profile features, those features are represented by values, and the values in one row are dimensions of the vector corresponding to that feedback. In certain embodiments, a feedback in a row may not have corresponding features for each dimension, and the dimensions the feedback lacks are given a value 0.

Figure 11:
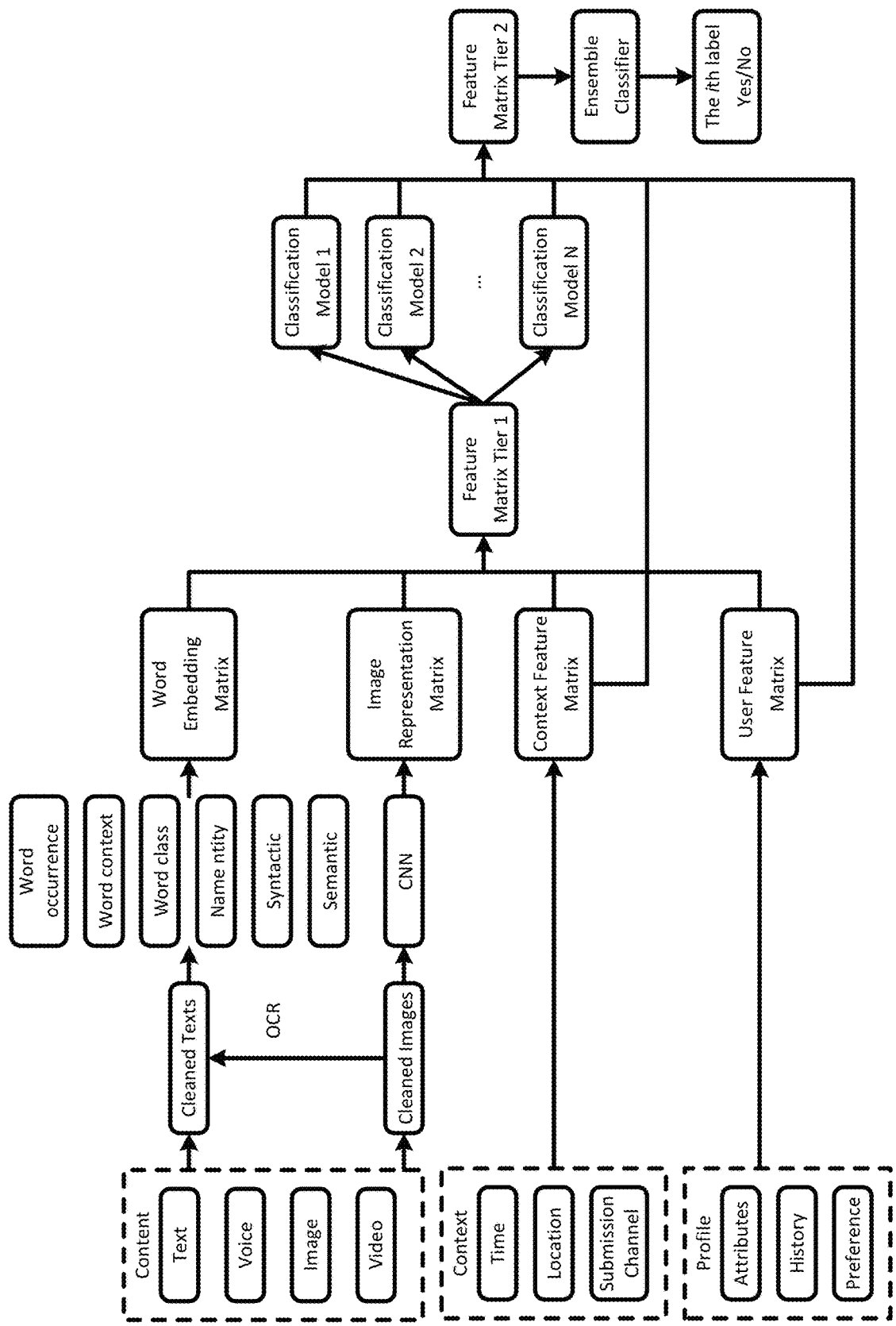
FIG. 11 schematically depicts an ensemble structure according to certain embodiments of the present disclosure.

Certain dimensions of the feature matrix are obtained by running AI processors, and after obtaining the matrix of the feedbacks, at procedure 914, the matrix and the corresponding function labels (or malfunction labels) are used as input to train the AI classifiers 228. FIG. 11 schematically shows an ensemble structure according to certain embodiments of the disclosure. Referring to FIG. 11, various machine learning classification models are applied, followed by ensemble mechanisms [6].

Given that feedback label distribution is imbalanced (some categories has far less feedbacks than others), feedback data is resampled via bootstrap [6], to make label more evenly distributed.

Gradient boosting tree classifier [11] is applied as the major classifier (e.g. the classification model 1 in FIG. 11). The data is a combination of categorical and continuous value types, and it is imbalanced. Gradient boosting tree is known to be successful with the data characteristics [11]. Moreover, to reduce bias by using a single model, hierarchical ensemble mechanism is applied. This ensemble is to synthesize gradient boosting tree with its peer models, such as random forest, logistic regression with penalty terms [6]. Each classifier output a predicted label. The classifiers are named as tier-1 classifiers, including classification model 1, classification model 2, . . . , and classification model N. Each of the classification models corresponds to a function of the platform. When the feature matrix tier-1 is used as input for each of the models, each model gives a result of whether the function corresponding to the model is talked about in the feedback. The results from all the classification models 1 to N are combined to form the feature matrix tier 2. For example, each result from one of the classification models is in a form of a binary decision, and the binary decisions from the classification models 1 to N are respectively defined as dimensions of a vector. Here the vector is the feature matrix tier-2 when one feedback is processed, or is one row of the feature matrix tier-2 when multiple feedbacks are processed. The feature matrix tier-2 information are integrated in the ensemble classifier, and the ensemble classifier provides the result of whether the ith label is a function that is related to the feedback or isn't related to the feedback. In certain embodiments, the output of whether the ith label is related to the feedback or not is in a form of a binary decision.

One uniqueness of this step is that the tier-1 contexts and the user features are re-used in tier-2. This is because during the training, it is observed that although these features have strong signal but their number is much less than text/image features. So when training tier-1 classifier, their signal is buried in the large number of text/image features. After tier-1, text/image features are reduced to a class label, so in tier-2 classifier, there are not many text/image features, and if we put context/user features as input in tier-2, we could make full use of their power. In certain embodiments, another gradient boosting tree classifier is used as the ensemble classifier.

Figure 12:
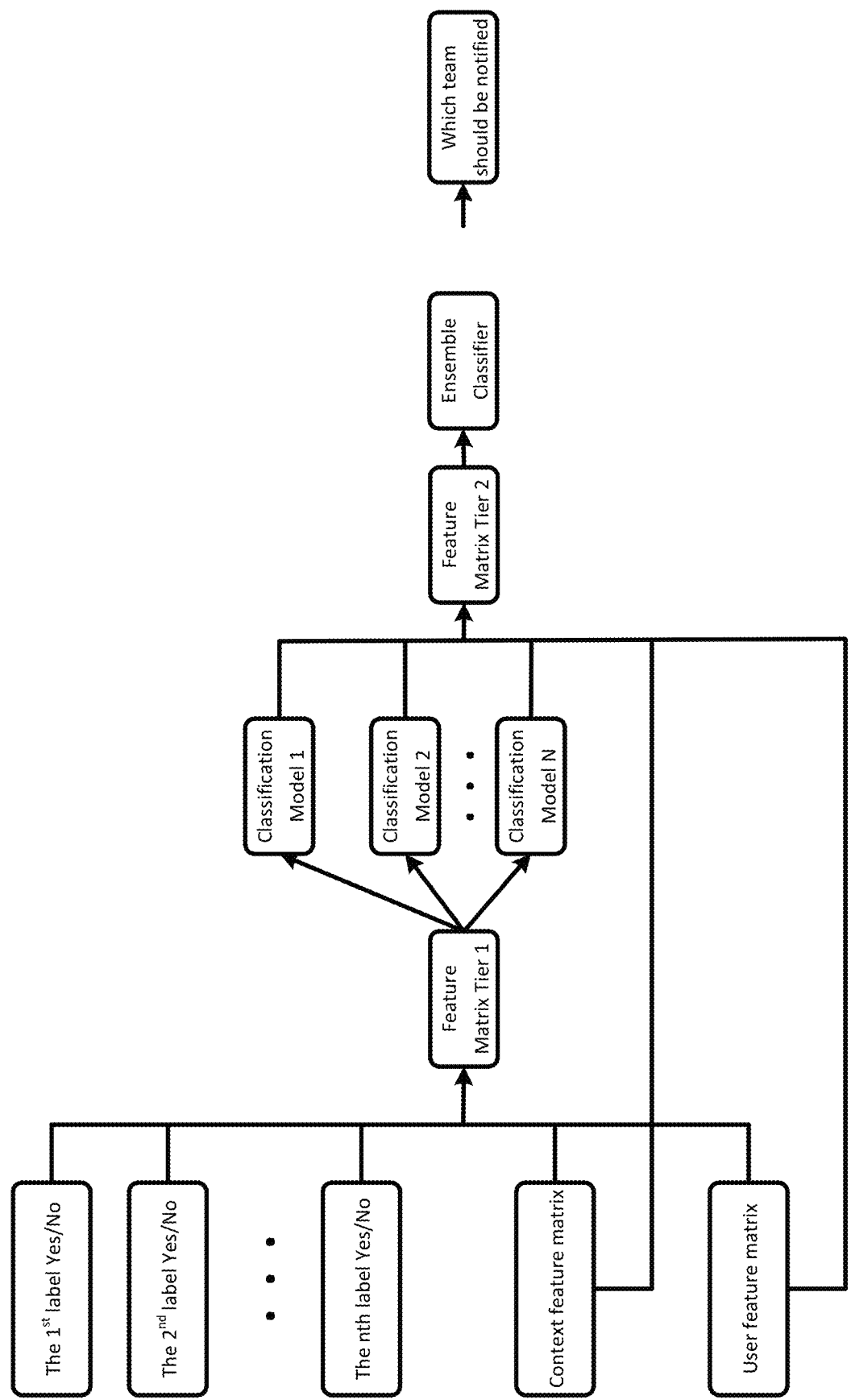
FIG. 12 schematically depicts a method to integrate all the one-versus-all classifiers according to certain embodiments of the present disclosure.

The process shown in FIG. 11 is to predict individual label. In other words, it determines the relationship between the matrix (or vectors in the matrix) with one specific function. The process can be repeated for each of the labels or functions. After that, as shown in FIG. 12, the result for all these labels are integrated to make final decision which label to be given to the feedback. In other words, when whether a feedback is related to each of the functions is determined, the process in FIG. 12 finds one function from the plurality of functions, where the one function relates to or is talked about in the feedback.

In certain embodiments, one-versus-all method [6] is used to train models one by one. This is because there are hundreds of categories—if we use one model for all the categories, the optimization will have hundreds of variables and computer can hardly find the optimal model. The one-versus-all means we take one category as positive while all others as negative. In other words, we train hundreds of 2-class classifiers, each predict if a feedback belongs to a category or not. Since all these classifiers are trained individually, they may have disagreement with each other—multiple classifiers may think a feedback belongs to their corresponding category but actually the feedback may only belong to one of them. So there is a demand to integrate these hundreds of opinions and find a way to get best consensus based on them. FIG. 12 schematically shows a method to integrate all the one-versus-all classifiers according to certain embodiments of the disclosure. Note that it is similar to FIG. 11 but serves distinct purposes. FIG. 11 is to predict individual label, while FIG. 12 is to integrate all these labels to make final decision which label to be given to the feedback. The label represents a particular malfunction owned by a particular team, so the label is used to map to a particular team and send the team the malfunction notification.

In certain embodiments, the above-mentioned machine learning model is re-trained and updated regularly to learn the latest classification patterns in data. In certain embodiments, an online training mechanism is enabled. Once AI made a mistake, e.g., sending a false alarm, the mistake information will be immediately sent back to AI models for an online retrain. So the system is real-time self-refined. Classification result is sent over to function owners, which include developers, product specialists and analysts, so that he can take certain actions to fix the detected issue.

Figure 13:
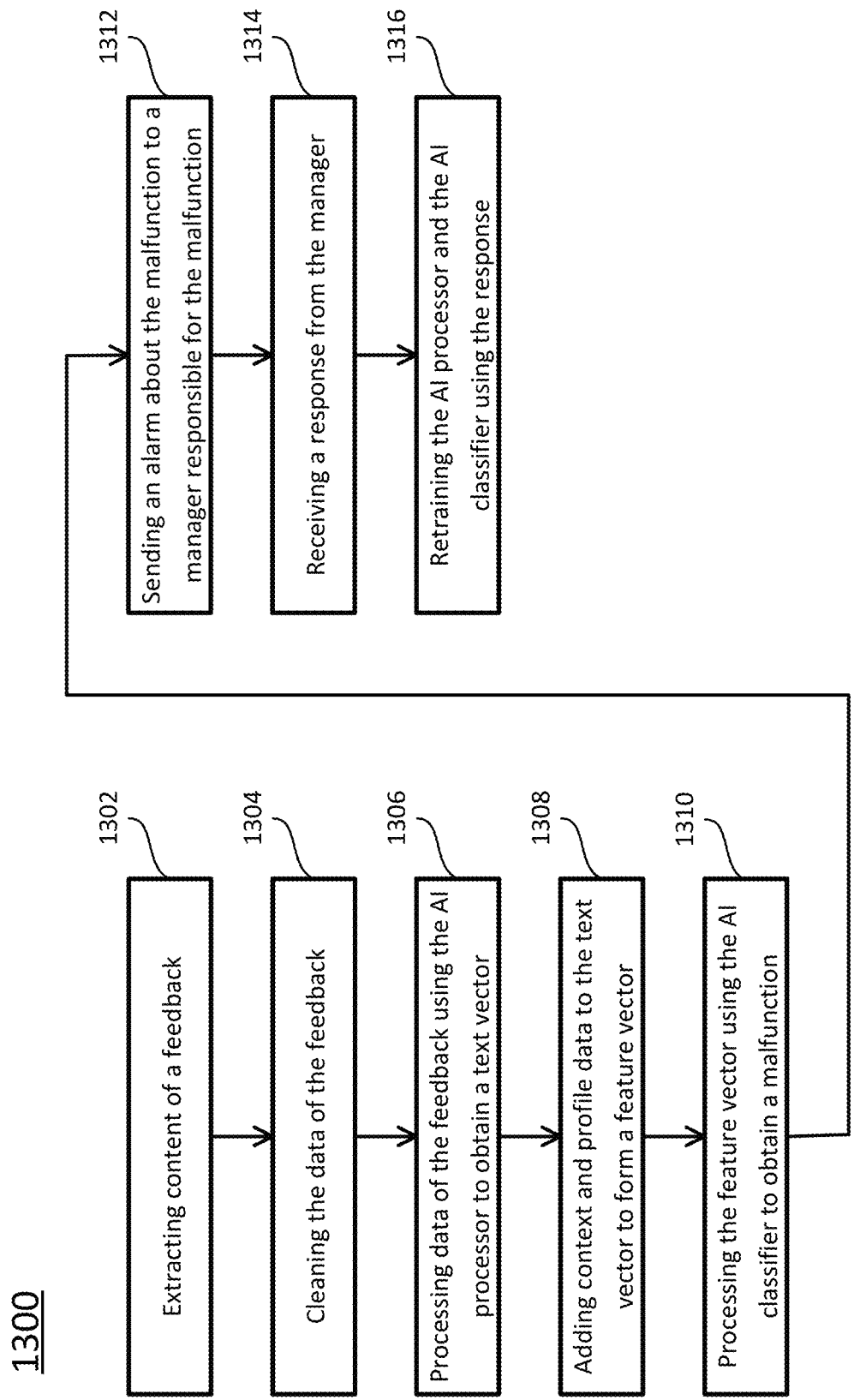
FIG. 13 schematically depicts a method for using an e-commerce platform monitoring system according to certain embodiments of the present disclosure.

After the training of the AI processors 224 and the AI classifiers 228, the platform monitor 220 can be used to monitor the health of the e-commerce platform. FIG. 13 schematically shows a method of using the platform monitor 220 to check the health of the e-commerce platform based on a feedback from a user. In certain embodiments, the method is implemented by the server computing device 210 shown in FIG. 2. It should be particularly noted that, unless otherwise stated in the present disclosure, the steps of the method may be arranged in a different sequential order, and are thus not limited to the sequential order as shown in FIG. 13.

As shown in FIG. 13, at procedure 1302, the feedback extraction module 222 extracts content of a feedback. The content may include at least one of a text, a voice, an image and a video.

At procedure 1304, the content pre-processor 2240 clean the content of the feedback.

After the content of the feedback is cleaned, at procedure 1306, the AI processors 224 process the cleaned content to obtain a text vector, and send the feature vector to the vector generator 226. The dimensions of the text vector are values correspond to the text in the content, the image text and background image in the content.

Then at procedure 1308, the vector generator 226 add the context and user profile of the feedback to the text vector as new dimensions to form a feature vector, and send the feature vector to the AI classifiers 228. The new dimensions include the time of the submission, the location of the submission, the submission channel, the attribute of the user, the history of the user and the preference of the user.

At procedure 1310, in response to receiving the feature vector, the classifier 228 process the feature vector to obtain a malfunction corresponding to the feature vector, and send the malfunction information to the manager communicator 230. Specifically, the classifier 228 determines whether the feature vector is function related, whether the status of the function represented by the feature vector is normal or abnormal/malfunction, which function is represented by the feature vector.

At procedure 1312, in response to receiving the malfunction information, the manager communicator 230 matches the malfunction to a specific manager or a team responsible for the malfunction, prepare an alarm, and send the alarm to the manager.

After receiving the alarm, the manager determines whether the malfunction is the one he is responsible for. If so, he would fix the malfunction. If not, the manager would send a response to the manager communicator 230 of the platform monitor 220.

At procedure 1314, the manager communicator 230 receives the response from the manager, the response includes the information that the feedback or the malfunction is not the responsibility of the manager.

At procedure 1316, the manager communicator 230 stores the error information from the manager to the database 232, and using the updated database 232 to retrain the AI classifiers 228.

In summary, the platform monitor according to certain embodiments of the present disclosure is a self-sufficiency, self-refining system. By utilizing the user's feedback (content, context and profile) and integrating them with knowledges about the platform (company team structure, application function structure, and their correspondence), the system is able to detect function issues in a timely, accurate and automatic manner, via harnessing the power of artificial intelligence including natural language processing, computer vision and machine learning.

The content, context and profile of a feedback is converted to a vector having a great number of dimensions, which makes the final malfunction decision accurate.

The number of dimensions of the vectors are easily expandable, and the function category structure is easily expandable, so that the incorporation of newly added information or function is convenient.

In the training of the AIs, the context and profile of the feedback are used under both tier-1 and tier-2 function models, such that the effect of the context and profile information are efficiently considered, without being overwhelmed by the effect of the content of the feedback.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Tomas Mikolov, Ilya Sutskever et al, Distributed Representations of Words and Phrases and their Compositionality
2. Quoc Le, Tomas Mikolov, Distributed Representations of Sentences and Documents
3. Yoon Kim, Convolutional Neural Networks for Sentence Classification
4. Pieraccini, Roberto. The Voice in the Machine. Building Computers That Understand Speech. The MIT Press
5. https://github.com/tesseract-ocr/
6. Trevor Hastie, Robert Tibshirani, and Jerome H. Friedman, The elements of statistical learning, 2001, Springer
7. Blei, David, Probabilistic Topic Models, Communications of the ACM, 2012, 55 (4): 77-84.
8. Christopher Manning, Hinrich Schutze, Foundations of statistical natural language processing, 1999, The MIT Press.
9. Mikolov, Tomas; et al. Efficient Estimation of Word Representations in Vector Space, arXiv:1301.3781
10. LeCun, Yann. LeNet-5, convolutional neural networks. Retrieved 16 Nov. 2013.
11. https://github.com/dmlc/xgboost

What is claimed is:

1. A method for fixing malfunction on an e-commerce platform, the method comprising:
   retrieving, by a computing device, a feedback submitted by a user through the e-commerce platform;
   generating, by feedback processors of the computing device performing artificial intelligence, a vector based on content of the feedback, context of the feedback and profile of the user, wherein the content comprises at least one of text, voice, image and video, wherein the context comprises at least one of time of submitting the feedback, location of submitting the feedback, and submission channel of the feedback, wherein the user profile comprises at least one of attributes of the user, purchasing history of the user, and preference of the user using the e-commerce platform, and wherein the vector comprises a pre-determined number of dimensions, and each of the text, the voice, the image, the video, the time of submitting the feedback, the location of submitting the feedback, the submission channel of the feedback, the attributes of the user, the purchasing history of the user, and the preference of the user corresponds to at least one of the dimensions of the vector;
   classifying, by tier-1 classifiers of the computing device, the vector, the tier-1 classifiers including multiple classification models, and each classification model giving a result corresponding to a function of the e-commerce platform in a form of a binary decision;
   generating, by the computing device, another vector according to the result, the context of the feedback and the profile of the user;
   classifying, by tier-2 classifiers of the computing device, said another vector to obtain a function of the e-commerce platform corresponding to the feedback and a status of the function, preparing an alarm based on the status of the function when the status is malfunction, and sending the alarm over a network to a managing computing device; and
   in response to receiving the alarm, fixing the malfunction via the managing computing device.

2. The method of claim 1, wherein the tier-2 classifiers are performed using at least one artificial intelligence model.

3. The method of claim 2, wherein the step of generating the vector comprises:
   processing the content using the feedback processors to obtain content dimensions of the vector corresponding to the text, the voice, the image, and the video.

4. The method of claim 3, further comprising: cleaning the content before processing the content to obtain the content dimensions of the vector.

5. The method of claim 3, further comprising: separating the image to text of the image and background image, processing the text of the image to obtain an image text result and processing the background image to obtain a background image result, and integrating the image text result and the background image result to obtain the content dimension of the vector corresponding to the image.

6. The method of claim 2, further comprising: receiving an instruction corresponding to the alarm from the manager when the alarm is false, and re-train the feedback processors and the classifiers using the instruction.

7. The method of claim 2, wherein the tier-1 and tier-2 classifiers are trained using a plurality of historical feedbacks and a function category structure, the function category structure comprises: a tier-1 category comprising website of the e-commerce platform, application of the e-commerce platform, and external links to the e-commerce platform.

8. The method of claim 7, wherein the tier-1 category of the website comprises tier-2 categories of: product page, shopping cart, and payment.

9. The method of claim 8, wherein the tier-2 category of the product page comprises tier-3 categories of: product description, product search, and product recommendation.

10. The method of claim 7, wherein the tier-2 classifiers comprise a plurality of classification models, each classification model of the tier-1 and tier-2 classifiers provides a candidate function based on each of the historical feedbacks, and the candidate functions provided by the classification models are used by an ensemble model to determine the function corresponding to each of the feedback.

11. A system for fixing malfunction on an e-commerce platform, the system comprising a computing device, the computing device comprising a processor and a storage device storing computer executable code, wherein the computer executable code, when executed at the processor, is configured to:
   retrieve a feedback submitted by a user through the e-commerce platform;
   generate, by performing artificial intelligence, a vector based on content of the feedback, context of the feedback and profile of the user, wherein the content comprises at least one of text, voice, image and video, wherein the context comprises at least one of time of submitting the feedback, location of submitting the feedback, and submission channel of the feedback, wherein the user profile comprises at least one of attributes of the user, purchasing history of the user, and preference of the user using the e-commerce platform, and wherein the vector comprises a pre-determined number of dimensions, and each of the text, the voice, the image, the video, the time of submitting the feedback, the location of submitting the feedback, the submission channel of the feedback, the attributes of the user, the purchasing history of the user, and the preference of the user corresponds to at least one of the dimensions of the vector;

classify the vector to obtain a result corresponding to a function of the e-commerce platform in a form of a binary decision;

generate another vector according to the result, the context of the feedback and the profile of the user; and classify said another vector to obtain a function of the e-commerce platform corresponding to the feedback and a status of the function, prepare an alarm based on the status of the function when the status is malfunction, and send the alarm over a network to a managing computing device, such that the malfunction is fixed via the managing computing device.

12. The system of claim 11, wherein computer executable code comprises feedback processors to generate the vector and classifiers to classify the vector, and the feedback processors and the classifiers comprises artificial intelligence models.

13. The system of claim 12, wherein the computer executable code is configured to generate the vector by: cleaning the content, and processing the content using the feedback processors to obtain content dimensions of the vector corresponding to the text, the voice, the image, and the video.

14. The system of claim 13, wherein the computer executable code is further configured to: separate the image to text of the image and background image, process the text of the image to obtain an image text result and process the background image to obtain a background image result, and integrate the image text result and the background image result to obtain the content dimension of the vector corresponding to the image.

15. The system of claim 12, wherein the computer executable code is further configured to: receive an instruction corresponding to the alarm from the manager when the alarm is false, and re-train the feedback processors and the classifiers using the instruction.

16. The system of claim 11, wherein the classifiers are trained using a plurality of historical feedbacks and a function category structure, the function category structure comprises:
 a tier-1 category comprising website of the e-commerce platform, application of the e-commerce platform, and external links to the e-commerce platform,
 the tier-1 category of the website comprises tier-2 categories of: product page, shopping cart, and payment, and
 the tier-2 category of the product page comprises tier-3 categories of: product description, product search, and product recommendation.

17. The system of claim 16, wherein the classifiers comprise a plurality of classification models, each classification model provides a candidate function based on each of the historical feedbacks, and the candidate functions provided by the classification models are used by an ensemble model to determine the function corresponding to each of the feedback.

18. A non-transitory computer readable medium storing computer executable code, wherein the computer executable code, when executed at a processor of a computing device, is configured to:
 retrieve a feedback submitted by a user through the e-commerce platform;
 generate, by performing artificial intelligence, a vector based on content of the feedback, context of the feedback and profile of the user, wherein the content comprises at least one of text, voice, image and video, wherein the context comprises at least one of time of submitting the feedback, location of submitting the feedback, and submission channel of the feedback, wherein the user profile comprises at least one of attributes of the user, purchasing history of the user, and preference of the user using the e-commerce platform, and wherein the vector comprises a pre-determined number of dimensions, and each of the text, the voice, the image, the video, the time of submitting the feedback, the location of submitting the feedback, the submission channel of the feedback, the attributes of the user, the purchasing history of the user, and the preference of the user corresponds to at least one of the dimensions of the vector;
 classify the vector to obtain a result corresponding to a function of the e-commerce platform in a form of a binary decision;
 generate another vector according to the result, the context of the feedback and the profile of the user; and
 classify said another vector to obtain a function of the e-commerce platform corresponding to the feedback and a status of the function, prepare an alarm based on the status of the function when the status is malfunction, and send the alarm over a network to a managing computing device, such that the malfunction is fixed via the managing computing device.

19. The non-transitory computer readable medium of claim 18, wherein the computer executable code comprises feedback processors to generate the vector and classifiers to classify the vector, and the feedback processors and the classifiers comprises artificial intelligence models.

20. The non-transitory computer readable medium of claim 18, wherein the computer executable code is configured to process the image by: separating the image to text of the image and background image, processing the text of the image to obtain an image text result, processing the background image to obtain a background image result, and integrating the image text result and the background image result to obtain the dimension of the vector corresponding to the image.

* * * * *